(12) United States Patent
Yu

(10) Patent No.: US 8,582,983 B2
(45) Date of Patent: Nov. 12, 2013

(54) METHOD AND SYSTEM FOR GENERATION OF COHERENT SUBCARRIERS

(75) Inventor: Jianjun Yu, Basking Ridge, NJ (US)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 124 days.

(21) Appl. No.: 13/411,191

(22) Filed: Mar. 2, 2012

(65) Prior Publication Data
US 2012/0230688 A1    Sep. 13, 2012

Related U.S. Application Data

(60) Provisional application No. 61/451,320, filed on Mar. 10, 2011.

(51) Int. Cl.
*H04B 10/04* (2011.01)

(52) U.S. Cl.
USPC .......... 398/188; 398/183; 398/194; 398/201; 398/159; 398/161; 398/76; 398/115

(58) Field of Classification Search
USPC ......... 398/183, 182, 184, 185, 186, 187, 188, 398/79, 189, 192, 200, 201, 76, 141, 115, 398/158, 159, 160, 161, 194
See application file for complete search history.

(56) References Cited

U.S. PATENT DOCUMENTS

| | | | |
|---|---|---|---|
| 7,853,153 B2* | 12/2010 | Kawanishi et al. | 398/183 |
| 2010/0215374 A1* | 8/2010 | Liu et al. | 398/98 |

* cited by examiner

*Primary Examiner* — Hanh Phan
(74) *Attorney, Agent, or Firm* — Novak Druce Connolly Bove + Quigg LLP

(57) ABSTRACT

A method and system for generating multi-subcarriers is disclosed. Re-circulating frequency shifters—based on the frequency shifting in two cascading phase modulators—are used to generate 112 subcarriers with stable architecture since there is no direct current bias in phase modulators.

20 Claims, 4 Drawing Sheets

System for multi-subcarrier generation.

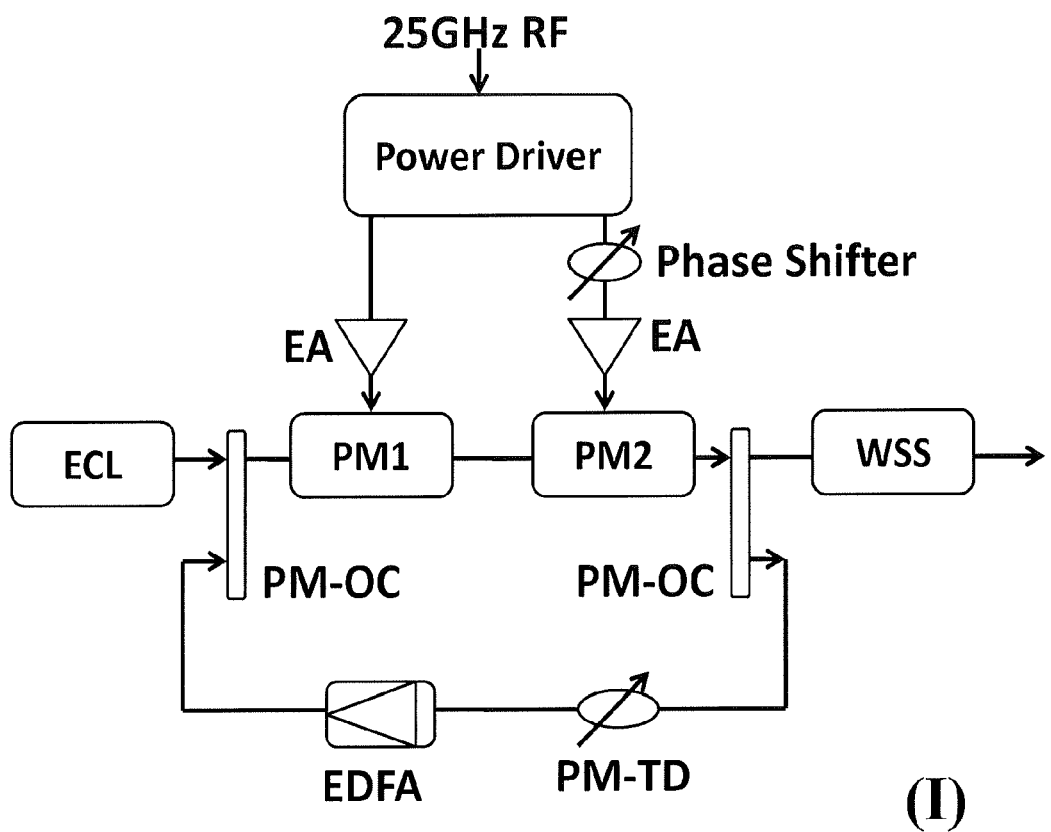
Fig. 1. System for multi-subcarrier generation.

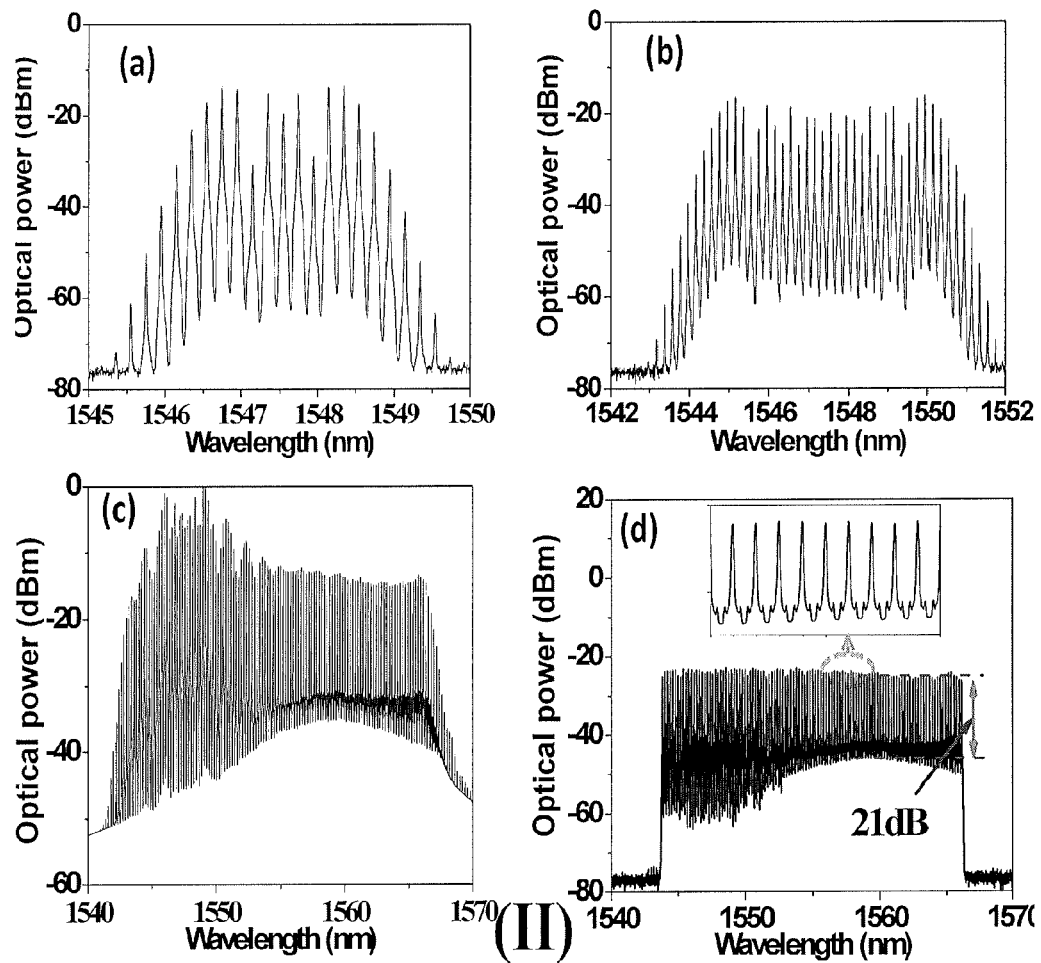
Fig. 2. Optical spectrum (0.02 resolution): (a) after PM1, (b) after PM2, (c) after OC2, and (d) after WSS

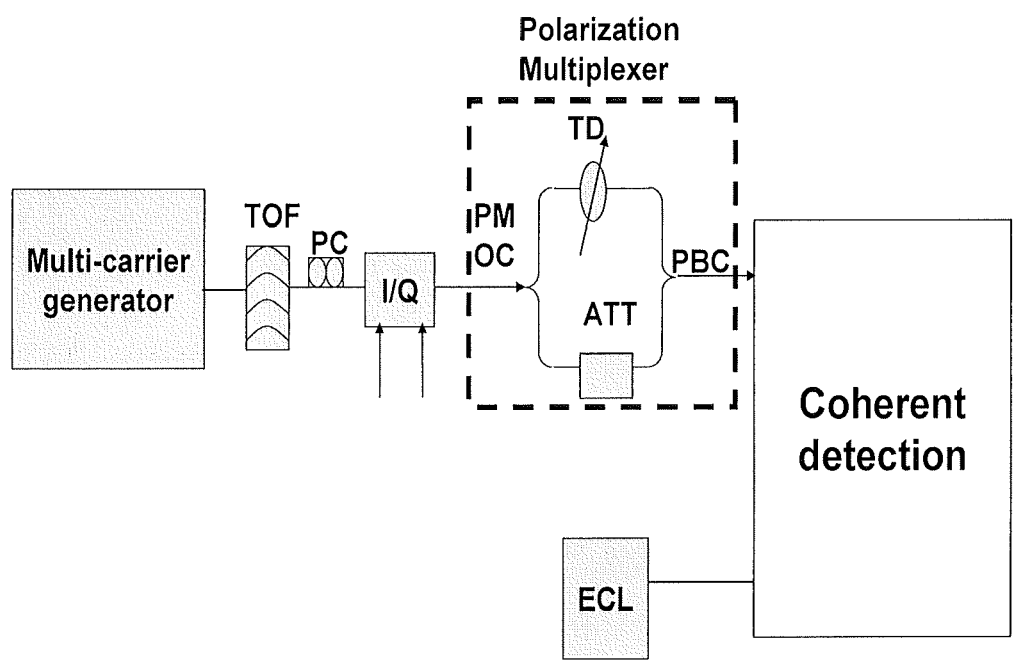
Fig. 3. System for 100 Gb/s QPSK signal generation

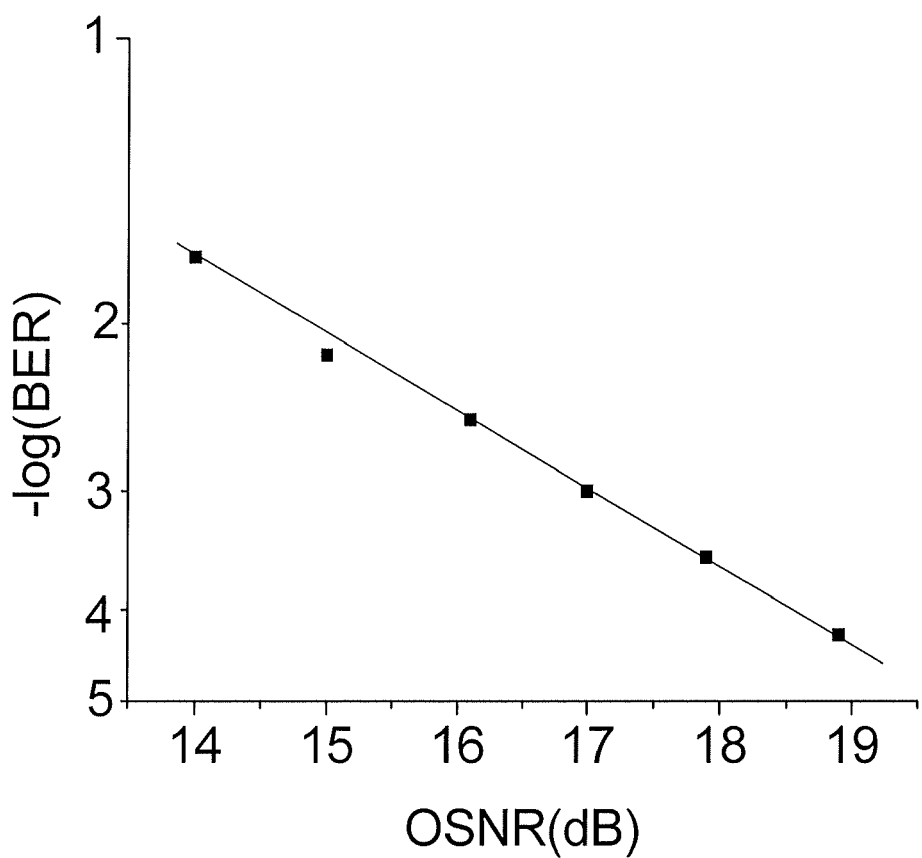
Fig. 4. BER curve from the system illustrated in Fig. 3

METHOD AND SYSTEM FOR GENERATION OF COHERENT SUBCARRIERS

FIELD OF THE INVENTION

The field of the present invention generally pertains to optical communication architecture, and particularly to optical methods and systems for generating multi-subcarriers.

BACKGROUND

In order to meet the bandwidth increase of optical networks of the future, a rate higher than 100 Gb/s per channel is required. As such, transmission rates of 1 Tb/s and beyond are becoming hot research topics, as described in T. Kawanishi, et. al., PTL, vol. 14, pp. 1454-1456 (2002); Y. Ma, Q. Yang, Y. Tang, S. Chen and W. Shieh, "1-Tb/s per channel coherent optical orthogonal frequency division multiplexing (OFDM) transmission with subwavelength bandwidth access", in Proc. OFC, paper PDPC1 (2009); R. Dischler, and F. Buchali, "Transmission of 1.2 Tb/s continuous waveband PDM-OFDM-FDM signal with spectral efficiency of 3.3 bit/S/Hz over 400 km of SSMF", in Proc. OFC2009, paper PDPC2 (2009); S. Chandrasekhar et al., "Transmission of a 1.2-Tb/s 24-Carrier no-guard-interval coherent OFDM superchannel over 7200-km of ultra-large-area fiber", in Proc. ECOC, paper PD 2.6 (2009); J. Yu, X. Zhou, M.-F. Huang, D. Qian, P. N. Ji, T. Wang, and P. Magill, "400 Gb/s (4×100 Gb/s) orthogonal PDM-RZ-QPSK DWDM Signal Transmission over 1040 km SMF-28", Opt Express., 17, 17928-17933 (2009); D. Hillerkuss et al., "Single source optical OFDM transmitter and Optical FFT receiver demonstrated at line rates of 5.4 and 10.8 Tbit/s", in Proc. OFC 2010, PDPC1 (2010); and J. Yu, "1.2 Tbit/s orthogonal PDM-RZ-QPSK DWDM signal transmission over 1040 km SMF-28", Electron. Lett, 46, 775-777 (2010).

Currently, the highest bit rate per channel for optical signal generation is 5.4 Tb/s OFDM polarization multiplexed quadrature phase shift key (PM-QPSK) and 10.8 Tb/s OFDM polarization multiplexed quadrature amplitude modulation with 16 symbol constellation (PM-16QAM) by the comb generation or supercontinuum technique described in D. Hillerkuss et al., "Single source optical OFDM transmitter and Optical FFT receiver demonstrated at line rates of 5.4 and 10.8 Tbit/s", in Proc. OFC 2010, PDPC1 (2010). However, due to the limited optical signal-to-noise ratio (OSNR) of the OFDM optical signal generation by the supercontinuum technique, transmission distance is quite limited.

Use of a cascaded phase modulator and intensity modulator can generate multi-optical subcarriers as described in J. Yu, X. Zhou, M.-F. Huang, D. Qian, P. N. Ji, T. Wang, and P. Magill, "400 Gb/s (4×100 Gb/s) orthogonal PDM-RZ-QPSK DWDM Signal Transmission over 1040 km SMF-28", Opt Express., 17, 17928-17933 (2009); J. Yu, "1.2 Tbit/s orthogonal PDM-RZ-QPSK DWDM signal transmission over 1040 km SMF-28", Electron. Lett, 46, 775-777 (2010); and T. Healy et al., "Multi-wavelength source using low drive-voltage amplitude modulators for optical communications," Opt. Express., 15, 2981-2986 (2007). Recently, by using this technique, generation of a 400-Gb/s optical signal has been demonstrated, as described in J. Yu, X. Zhou, M.-F. Huang, D. Qian, P. N. Ji, T. Wang, and P. Magill, "400 Gb/s (4×100 Gb/s) orthogonal PDM-RZ-QPSK DWDM Signal Transmission over 1040 km SMF-28", Opt Express., 17, 17928-17933 (2009), and generation of a 1.2 Tb/s optical signal is described in J. Yu, "1.2 Tbit/s orthogonal PDM-RZ-QPSK DWDM signal transmission over 1040 km SMF-28", Electron. Lett, 46, 775-777 (2010).

Due to the limited amplitude of the radio frequency (RF) signals on the phase modulator, only 12 subcarriers (with 25 GHz spacing) are generated, covering an approximate 300 GHz bandwidth with flat spectrum amplitude, as described in J. Yu, "1.2 Tbit/s orthogonal PDM-RZ-QPSK DWDM signal transmission over 1040 km SMF-28", Electron. Lett, 46, 775-777 (2010). In order to increase the bit rate for the single channel OFDM signals, more subcarriers need to be generated.

Superchannel generation has been demonstrated by using re-circulating frequency shifter (RFS) based on the frequency shifting in a single-side band (SSB) modulator. Due to the erbium-doped fiber amplifiers (EDFA) amplified spontaneous emission (ASE) noise accumulation, the achieved maximum number of subcarriers is less than 50 and limited to a 350 GHz spectral range. Also, the SSB modulator-based RFS has a stability problem due to the nonlinearity and direct current (DC) bias of optical in-phase/quadrature (I/Q) modulator (IQM or I/Q MOD). Accordingly, an improved method and system for generating more subcarriers is desired.

SUMMARY OF THE INVENTION

The present invention is directed toward a method and system for generating multiple subcarrier optical signals. According to aspects of the invention, 112 subcarriers are each capable of carrying a 100 Gbit/s signal.

In these methods and systems, a lightwave generated from a laser, which has a linewidth smaller than 100 kHz, is modulated by a plurality of cascading phase modulators driven by radio frequency signals that have amplitudes at least a few times greater than the half-wave voltage of the first phase modulator in the cascade. Moreover, the phase modulators are characterized by the absence of any DC bias controller.

A recirculation loop may be used to generate a plurality of stable subcarriers and a programmable wavelength selective switch may be used to shape the amplitude of each subcarrier and to suppress certain subcarriers. The programmable wavelength selective switch may have a minimal bandwidth of 0.15 nm per channel.

The optical components—including optical couplers, but excluding the wavelength selective switch—may be polarizing-maintaining optical components. In addition, the radio frequency signal driving the cascaded phase modulators may be phase-synchronized to generate over 22 peaks with flat amplitude.

Additional aspects and advantages of the invention will appear from the drawings and the description of the preferred embodiment.

BRIEF DESCRIPTION OF THE DRAWINGS

Embodiments of the present invention are illustrated by way of the accompanying drawings, in which:

FIG. 1 is a block diagram of a multi-subcarrier generation system;

FIG. 2 illustrates an optical spectrum (with 0.02 resolution) of a lightwave after (a) phase modulator 1, (b) phase modulator 2, (c) optical coupler 2, and (d) wavelength selective switch;

FIG. 3 is illustrates a system for 100 Gb/s quadrature phase shift keying (QPSK) signal generation; and FIG. 4 illustrates the bit-error-ratio curve from the system illustrated in FIG. 3.

DETAILED DESCRIPTION OF THE PREFERRED EMBODIMENT

A scheme for generating subcarriers uses a re-circulating frequency shifter (RFS) is used to generate 112 subcarriers (or peaks) based upon the frequency shifting in at least two cascading phase modulators. Due to the absence of DC bias, the phase modulators advantageously operate in a substantially stable manner.

Turning in detail to the figures, the multi-peak generation principle is shown in FIG. 1. In contrast to the RFS architecture disclosed in T. Kawanishi, et. al., PTL, vol. 14, pp. 1454-1456, 2002 and S. Chandrasekhar et al., "Transmission of a 1.2-Tb/s 24-Carrier no-guard-interval coherent OFDM superchannel over 7200-km of ultra-large-area fiber", in Proc. ECOC, paper PD 2.6 (2009), two optical couplers and cascading phase modulators are employed.

The continuous wave (CW) lightwave generated from one narrow linewidth laser, in which the linewidth is smaller than about 100 kHz, is connected with one of the optical couplers (OC). The output from one port of the optical coupler is modulated by the two cascading phase modulators. Each phase modulator is driven by a RF clock signal with a fixed frequency of f. The amplitude of the RF signal after one booster electrical amplifier (EA) is a few times greater than the half-wave voltage of the first phase modulator (PM1), thereby generating multiple subcarriers with a high OSNR.

FIG. 2(a) shows the optical spectrum after PM1. Due to the limited amplitude of the RF signal, the peak amount is limited. In the system shown, to generate the depicted optical spectrum, the RF clock frequency is 25 GHz and the RF peak-to-peak voltage after the booster EA is 17V, and the half-wave voltage of the phase modulator is 4V. To obtain more subcarriers, a second phase modulator (PM2) is positioned in a cascading arrangement with PM1. PM2 is also driven by a high-level RF signal with fixed frequency of f to generate additional peaks.

The optical spectrum after PM2 is shown in FIG. 2(b). The phase of the electrical signals on PM1 and PM2 is preferably synchronized to generate over 22 peaks (the most numbers) with flat amplitude. The output of PM2 is connected with another optical coupler. An EDFA is employed to provide signal gain for the recirculation loop. One optical delay line (PM-TD) is utilized to change the length of the recirculation loop to generate stable subcarriers, such as is described in T. Kawanishi, et. al., PTL, vol. 14, pp. 1454-1456 (2002). The output of the recirculation loop passes through a programmable wavelength selective switch (WSS) to shape the amplitude of each subcarrier and suppress unwanted subcarriers with small amplitudes. The minimal bandwidth of the WSS for each channel is about 0.15 nm.

FIG. 2(c) shows the optical spectrum of the recirculation loop, and FIG. 2(d) shows the optical spectrum after the WSS. The amplitude difference between different subcarriers is preferably smaller than 2 dB. The wavelength ranges from about 1543.78 to 1566.16 nm, which corresponds to a bandwidth of 22.4 nm, or 2.8 THz. There are 112 subcarriers with subcarrier spacing of about 0.2 nm (25 GHz). The resolution of all optical spectra in FIGS. 2(a)-(d) is about 0.02 nm.

Preferably, all optical components, except the WSS, are polarization-maintaining optical components. Because there is not any DC bias controller in the phase modulators, excellent stability can be obtained. The system as shown and described conformed to the following parameters, although it is anticipated that other parameters could be used for implementation. The two phase modulators have identical performance, and the insertion loss of each phase modulator is about 4 dB. The output power for the external cavity laser (ECL) at 1547.54 nm is about 14.5 dBm, and the linewidth of the ECL is smaller than about 100 kHz. The two polarization-maintaining optical couplers (PM-OC) are also preferably identical, with an insertion loss of about 3.1 dB and a coupling ratio of about 50:50. The optical time delay has an insertion loss of about 1.8 dB, which is used for synchronization in the recirculation loop, as described in T. Kawanishi, et. al., PTL, vol. 14, pp. 1454-1456 (2002). The polarization-maintaining EDFA output power is about 82 mW.

Depending upon the particular implementation, a subcarrier may be used to carry a 100 Gbit/s optical signal. FIG. 3 shows the 100 Gb/s QPSK signal generation and coherent detection. Any subcarrier can be used to carry 100 Gb/s signal.

For example, a bandpass tunable optical filter (TOF), with a bandwidth of about 0.15 nm, may be used to select one subcarrier at 1558.41 nm with the smallest OSNR from the multi-carrier source. One I/Q MOD driven by two sets of 25 Gb/s random binary sequence with a word length of ($2^{13}$−1)×4 may be used to modulate the subcarrier with independent QPSK signals. The I/Q MOD may contain two parallel Mach-Zehnder modulators, which may both be biased at the null point and driven at full swing to achieve zero-chirp 0/π phase modulation. The phase difference between the upper and the lower branch of I/Q MOD is fixed at $\pi/2$. After I/Q modulation, the optical carrier carrying 50 Gb/s QPSK data may be polarization multiplexed. The polarization multiplexer may include a PM-OC to halve the signal, an optical delay line (DL2) to provide 150 symbol delay, and a polarization beam combiner (PBC) to recombine the signal. The bit rate after the polarization multiplexing is anticipated to be about 100 Gb/s.

At the receiver, an ECL with a line-width less than 100 kHz may be employed as the local oscillator (LO). A polarization-diverse 90 degree hybrid may be used to realize the polarization and phase-diverse coherent detection of the LO and received optical signal before balance detection. The sample and digitization (A/D) may be realized with 80 Gs/s sample rate and 30 GHz electrical bandwidth. The captured data may be processed through offline DSP as described in J. Yu, X. Zhou, M.-F. Huang, D. Qian, P. N. Ji, T. Wang, and P. Magill, "400 Gb/s (4×100 Gb/s) orthogonal PDM-RZ-QPSK DWDM Signal Transmission over 1040 km SMF-28", Opt Express., 17, 17928-17933 (2009).

The back-to-back bit-error-ratio (BER) as a function of OSNR (0.1 nm resolution, dual-polarization) is illustrated in FIG. 4. The OSNR of the single subcarrier at the BER of $1\times10^{-3}$ is 16.1 dB with sets consisting of 10×65000 symbols.

Thus, an improved scheme employing an RFS technique based on the frequency shifting in multiple (at least two) cascading phase modulators to generate 112 subcarriers with 25 GHz spacing has been demonstrated. Each subcarrier can be used to carry a 100 Gb/s polarization multiplexing QPSK signal. The required OSNR for this 100 Gbit/s polarization multiplexing QPSK signal carried by one subcarrier at the BER of $1\times10^{-3}$ is about 16.1 dB.

In certain aspects of the present invention, one or more of the elements provided may take the form of computing devices. A "computing device," as used herein, refers to a general purpose computing device that includes a processor. A processor generally includes a Central Processing Unit (CPU), such as a microprocessor. A CPU generally includes an arithmetic logic unit (ALU), which performs arithmetic and logical operations, and a control unit, which extracts instructions (e.g., code) from a computer readable medium, such as a memory, and decodes and executes them, calling on the ALU when necessary. "Memory," as used herein, generally refers to one or more devices or media capable of storing data, such as in the form of chips or drives. Memory may take the form of one or more random-access memory (RAM), read-only memory (ROM), programmable read-only memory (PROM), erasable programmable read-only memory (EPROM), or electrically erasable programmable read-only memory "EEPROM" chips, by way of further non-limiting example only. Memory may take the form of one or more solid-state, optical or magnetic-based drives, by way of further non-limiting example only. Memory may be internal or external to an integrated unit including the processor. Memory may be internal or external to a computing device. Memory may store a computer program, e.g., code or a sequence of instructions being operable by the processor. In certain aspects of the present invention, one or more of the elements provided may take the form of code being executed using one or more computing devices, such as in the form of computer device executable programs or applications being stored in memory.

While embodiments of this invention have been shown and described, it will be apparent to those skilled in the art that many more modifications are possible without departing from the inventive concepts herein. As one example, the signal processing described herein may be implemented in software or in hardware. The invention, therefore, is not to be restricted except in the spirit of the following claims.

What is claimed:

1. A method of generating multi-subcarrier signals using optical components, the method comprising:
    modulating a lightwave by a first phase modulator having a half-wave voltage and then by a second phase modulator, wherein the first and the second phase modulators are driven by a first and a second radio frequency signal, respectively, each radio frequency signal having a fixed frequency and amplitude, wherein the each amplitude is at least a few times greater than the half-wave voltage of the first phase modulator;
    providing a recirculation loop comprising one or more erbium-doped fiber amplifiers and an optical delay line, wherein the optical delay line is configured to generate a plurality of stable subcarriers, each stable subcarrier having a subcarrier amplitude; and
    using a programmable wavelength selective switch to shape each subcarrier amplitude and to suppress certain ones of the stable subcarriers.

2. The method of claim 1, wherein the optical components, except the wavelength selective switch, are polarizing-maintaining optical components.

3. The method of claim 1, wherein the lightwave is generated from a laser having a linewidth smaller than about 100 kHz.

4. The method of claim 1, wherein the programmable wavelength selective switch includes a plurality of channels, each with a minimal bandwidth of about 0.15 nm.

5. The method of claim 1, wherein the recirculation loop includes an output that passes through the programmable wavelength selective switch.

6. The method of claim 1, wherein the radio frequency signal driving the first phase modulator and the radio frequency signal driving the second phase modulator are phase-synchronized to generate at least 22 peaks with flat amplitude.

7. The method of claim 1, wherein the first phase modulator and the second phase modulator are characterized by the absence of any DC bias controller.

8. The method of claim 1, wherein each of the stable subcarriers is capable of carrying an approximately 100 Gbit/s signal.

9. The method of claim 1, further comprising selecting one of the subcarriers with the smallest optical signal-to-noise ratio.

10. The method of claim 1, wherein the plurality of stable subcarriers is 112 stable subcarriers.

11. A system for generating multi-subcarrier signals using optical components comprising:
    at least two phase modulators arranged as a cascade, each configured to modulate a lightwave;
    a recirculation loop comprising one or more erbium-doped fiber amplifiers and an optical delay line, wherein the optical delay line is configured to generate a plurality of stable subcarriers in the lightwave, each stable subcarrier having an amplitude; and
    a programmable wavelength selective switch configured to shape the amplitude of each subcarrier and to suppress certain subcarriers.

12. The system of claim 11, wherein the optical components, except the wavelength selective switch, are polarizing-maintaining optical components.

13. The system of claim 11, further comprising at least two couplers.

14. The system of claim 11, wherein the programmable wavelength selective switch has a plurality of channels and a minimal bandwidth, and the minimal bandwidth is 0.15 nm per channel.

15. The system of claim 11, wherein the recirculation loop has an output line that is connected to the programmable wavelength selective switch.

16. The system of claim 11, further comprising at least two phase-synchronized radio frequency drivers, each driving one of the phase modulators.

17. The system of claim 11, wherein the at least two phase modulators are characterized by the absence of any DC bias controller.

18. The system of claim 11, wherein each of the subcarriers is capable of carrying an approximately 100 Gbit/s optical signal.

19. The method of claim 11, further comprising a tunable optical filter for selecting one of the subcarriers with the smallest optical signal-to-noise ratio.

20. The method of claim 11, wherein the plurality of stable subcarriers is 112 stable subcarriers.

* * * * *